(12) United States Patent
Lesbirel et al.

(10) Patent No.: US 10,913,491 B2
(45) Date of Patent: Feb. 9, 2021

(54) CONTROL SYSTEM FOR A STEERING SYSTEM

(71) Applicant: JAGUAR LAND ROVER LIMITED, Warwickshire (GB)

(72) Inventors: Robbie Lesbirel, Coventry (GB); Riccardo Ficca, Coventry (GB); Gustavo Jaramillo-Moscoso, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 133 days.

(21) Appl. No.: 16/100,388

(22) Filed: Aug. 10, 2018

(65) Prior Publication Data

US 2019/0047616 A1 Feb. 14, 2019

(30) Foreign Application Priority Data

Aug. 11, 2017 (GB) .................... 1712900.8

(51) Int. Cl.
| | | |
|---|---|---|
| *B62D 6/00* | (2006.01) | |
| *B62D 6/10* | (2006.01) | |
| *B60W 20/00* | (2016.01) | |
| *B60W 10/20* | (2006.01) | |
| *B62D 15/02* | (2006.01) | |

(52) U.S. Cl.
CPC ............. *B62D 6/006* (2013.01); *B60W 20/00* (2013.01); *B62D 6/008* (2013.01); *B62D 6/10* (2013.01); *B62D 15/029* (2013.01); *B60W 10/20* (2013.01); *B60W 2510/18* (2013.01);
(Continued)

(58) Field of Classification Search
CPC .. B60W 10/20; B60W 20/00; B60W 2510/18; B60W 2520/10; B60W 2520/20; B60W 2540/18; B60W 2710/202; B62D 15/029; B62D 6/006; B62D 6/008; B62D 6/10
See application file for complete search history.

(56) References Cited

U.S. PATENT DOCUMENTS 4,882,693 A * 11/1989 Yopp ..................... B62D 5/00
701/37
5,123,497 A * 6/1992 Yopp .................. B60G 17/0162
180/422
(Continued)

FOREIGN PATENT DOCUMENTS

DE 3922528 C1 7/1990
DE 102005012548 2/2006
(Continued)

OTHER PUBLICATIONS

The German Search Report for DE Application No. 10 2018212753.0, dated Jul. 11, 2019.
(Continued)

*Primary Examiner* — Tyler J Lee
(74) *Attorney, Agent, or Firm* — Carlson, Gaskey & Olds (57) ABSTRACT

A control system for a steering system of a vehicle, the control system comprising: a processing module configured to obtain an indication of a proximity of a road wheel of the vehicle to a limit of adhesion, and to generate a driver feedback signal in the event that the road wheel is at or beyond the limit of adhesion; and an output arranged to issue the driver feedback signal.

19 Claims, 7 Drawing Sheets

(52) U.S. Cl.
    CPC ..... *B60W 2520/10* (2013.01); *B60W 2520/20* (2013.01); *B60W 2540/18* (2013.01); *B60W 2710/202* (2013.01)

(56) References Cited

U.S. PATENT DOCUMENTS

| | | | | |
|---|---|---|---|---|
| 5,388,658 | A * | 2/1995 | Ando | B60K 23/0808 |
| | | | | 180/197 |
| 5,747,682 | A * | 5/1998 | Hirano | B60T 8/17551 |
| | | | | 73/115.07 |
| 6,549,842 | B1 * | 4/2003 | Hac | B60T 8/172 |
| | | | | 303/149 |
| 7,441,627 | B2 * | 10/2008 | Ohta | B62D 5/008 |
| | | | | 180/446 |
| 7,680,577 | B2 * | 3/2010 | Mori | B60T 8/172 |
| | | | | 701/69 |
| 7,734,406 | B1 * | 6/2010 | Oppenheimer | B60T 8/885 |
| | | | | 180/197 |
| 7,756,620 | B2 * | 7/2010 | Bedner | B62D 6/003 |
| | | | | 180/421 |
| 7,835,836 | B2 * | 11/2010 | Bolourchi | B62D 6/002 |
| | | | | 180/197 |
| 8,234,042 | B2 * | 7/2012 | Bolio | B62D 5/008 |
| | | | | 180/402 |
| 8,392,089 | B2 * | 3/2013 | Spetler | B60T 8/1725 |
| | | | | 701/82 |
| 8,412,435 | B2 * | 4/2013 | Maitlen | B60G 17/0165 |
| | | | | 180/197 |
| 9,783,061 | B2 * | 10/2017 | Tronnberg | B60L 3/106 |
| 2001/0054954 | A1 | 12/2001 | Matsumoto et al. | |
| 2004/0039513 | A1 * | 2/2004 | Knoop | B60T 7/22 |
| | | | | 701/70 |
| 2004/0193374 | A1 * | 9/2004 | Hac | B60W 10/06 |
| | | | | 701/301 |
| 2008/0109135 | A1 | 5/2008 | Lemmen et al. | |
| 2009/0228173 | A1 * | 9/2009 | Bolio | B62D 5/008 |
| | | | | 701/41 |
| 2012/0203399 | A1 * | 8/2012 | Filev | B60W 30/02 |
| | | | | 701/1 |
| 2015/0151737 | A1 * | 6/2015 | Birch | B60W 20/15 |
| | | | | 701/22 |
| 2017/0158227 | A1 * | 6/2017 | Katzourakis | B62D 6/008 |
| 2019/0161064 | A1 * | 5/2019 | Zdych | B60K 28/16 |

FOREIGN PATENT DOCUMENTS

| | | |
|---|---|---|
| DE | 102007053815 | 5/2009 |
| EP | 2112053 | 10/2009 |
| JP | H05139327 A | 6/1993 |
| JP | H05170124 A | 7/1993 |
| JP | H0624349 A | 12/1994 |

OTHER PUBLICATIONS

Combined Search and Examination Report under Sections 17 and 18(3) for Application No. GB1712900.8 dated Dec. 13, 2017.

* cited by examiner

CONTROL SYSTEM FOR A STEERING SYSTEM

CROSS REFERENCE TO RELATED APPLICATION

This application claims priority to United Kingdom Patent Application No. GB 1712900.8, filed on 11 Aug. 2017.

TECHNICAL FIELD

The present disclosure relates to a control system for a steer-by-wire steering system. Aspects of the invention relate to a control system, to a steer-by-wire steering system, to a vehicle and to a method.

BACKGROUND

When a vehicle moves, friction between the surface of the ground and the tyres of the vehicle road wheels provides a combination of shear forces: longitudinal force, to propel the vehicle forwards or backwards; and lateral force, to turn the vehicle and change its direction of travel.

The magnitude of a tyre's lateral force is related to the tyre's slip angle, which is defined as the angle between the tyre's angle relative to the vehicle and the direction of travel of the tyre. In other words, the slip angle corresponds to an angle between the direction in which a tyre is pointing and the direction in which the contact patch area of the tyre, where it meets the ground, is moving. For example, if the slip angle is zero, the angle of a given road wheel is aligned with its direction of travel, in which case the lateral force provided by the tyres is low, tending to zero.

Slip at the contact patch is driven by a resultant balance or imbalance of forces generated when a road wheel is not aligned with the vehicle. To turn the vehicle a centripetal force must be generated, which manifests as a lateral force provided by the tyres through slip build-up. If the slip angle continues to increase, either through increasing vehicle speed, increasing steering angle, or both, eventually the centripetal force required becomes too large for the tyres to provide, resulting in loss of traction and understeer or oversteer.

Figure 1:
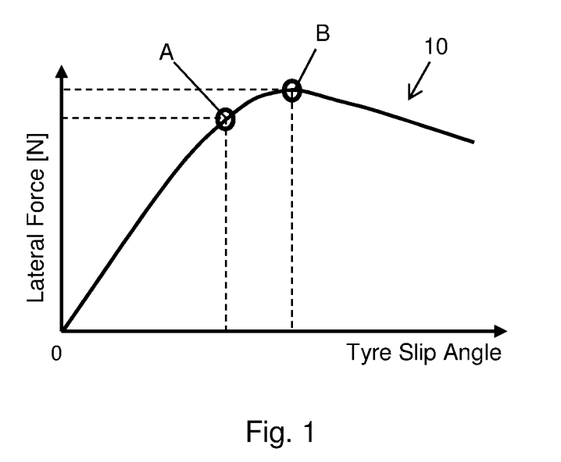

FIG. 1 shows a curve 1 representing the relationship between the lateral force and the slip angle more precisely. As the curve 1 indicates, for low slip angles the relationship is generally linear, defining a linear region in which the lateral force is directly proportional to the slip angle.

As the slip angle increases beyond a threshold, which is denoted by a first set of dashed lines and a point on the curve 1, labelled 'A', in FIG. 1, the relationship becomes non-linear as a limit of adhesion (point 'B') is approached. This entails that increasing the slip angle does not provide a proportionally linear increase in lateral force beyond the threshold defined by point A.

The non-linear region continues with increasing slip angle until the curve 1 finds its peak, which defines the limit of adhesion of the tyre (point 'B'), beyond which the curve 1 slopes downwards. In this downwardly-inclined region of the curve 1, a further increase in the slip angle decreases the lateral force provided by the tyre. In practical terms, this means that the tyre loses traction beyond the limit of adhesion and therefore cannot supply any further lateral force. If referring to the front tyres this is known as 'understeer'. Conversely, if referring to the rear tyres such loss of traction is known as 'oversteer'.

For a given vehicle speed, a maximum slip angle is defined beyond which turning the steering wheel to increase the slip angle results in loss of traction of one or more tyres, causing either understeer or oversteer. Therefore, the limit of adhesion defines a maximum vehicle speed for a given slip angle and for a particular surface grip level on which the vehicle travels.

Figure 2:
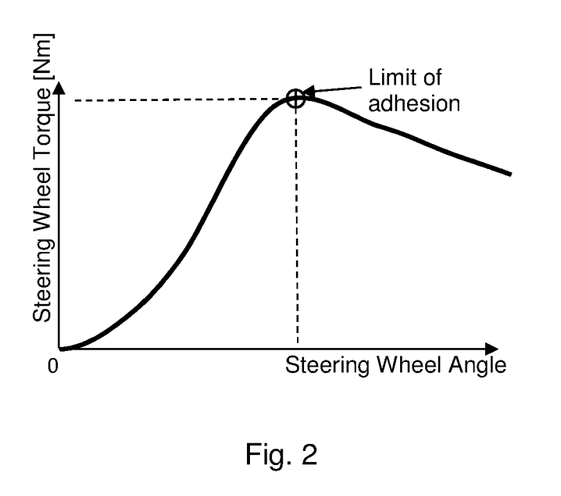

A twisting moment generated at a contact patch area between each turning tyre and the road is translated into torque that presents resistance to turning the steering wheel. As shown in FIG. 2, this resistance also increases with the slip angle. Below the limit of adhesion, resistance increases steadily, albeit non-linearly. Once the limit of adhesion is exceeded the resistance to steering reduces, indicating that the tyres have lost traction and are therefore easier to turn.

The reduction in steering resistance after exceeding the limit of adhesion, although relatively subtle from a driver's perspective, is somewhat counter-intuitive. So, if the driver notices the change in resistance they may react inappropriately by increasing the steering angle further, thus worsening the loss of traction. Conversely, if the driver does not notice the change in resistance, they may not realise that traction has been lost and therefore will not take corrective action.

This problem applies to mechanical steering systems including a physical link between the steering wheel and the road wheels, and also to electronic steering systems, commonly referred to as 'steer-by-wire' systems, as such systems can incorporate torque-feedback to emulate the behaviour of mechanical systems as shown in FIG. 2.

In a steer-by-wire system, typically a sensor detects the extent to which the steering wheel is rotated, and a steering controller operates actuators to turn the road wheels proportionally to the measured steering wheel angle. As the extent to which the road wheels are turned is determined by the steering controller, the steering ratio, namely the relationship between the steering wheel and the road wheels, can be varied if desired.

For example, the steering controller may deviate from a nominal relationship between the steering wheel and the road wheels when the limit of adhesion is approached, to avoid a loss of traction in the interest of safety; this provides the driver with a margin of error against losing traction. However, the extent of the allowable deviation from the nominal can be limited to a relatively narrow range, to avoid the steering wheel seeming unresponsive, and to avoid unacceptable delays in the time taken to revert the system back to its nominal relationship. If the driver turns the steering wheel beyond the maximum allowable deviation, the road wheels are turned beyond their limit of adhesion.

Thus, allowing deviation from the nominal steering relationship can prevent and/or minimise the consequences of an incorrectly negotiated corner. However, the above mentioned problem of counter-intuitive feedback to the driver as a result of torque feedback through the steering system persists.

It is against this background that the present invention has been devised.

SUMMARY OF THE INVENTION

According to an aspect of the present invention there is provided a control system for a steer-by-wire steering system of a vehicle. The control system comprises, a processing module configured to obtain an indication of a proximity of a road wheel of the vehicle to a limit of adhesion; a control means arranged to issue control commands to effect turning of the road wheel in dependence on a signal indicative of the position of a steering member in accordance with a nominal relationship between the steering member and the road wheel; and, to deviate from the nominal relationship between the steering member of the steer-by-wire steering system and the road wheel of the vehicle when the control means determines that the road wheel is at or beyond the limit of adhesion; and to generate an output arranged to issue the driver a feedback signal.

For example, the driver feedback signal may comprise a torque profile for a steering member of the steer-by-wire steering system, the torque profile comprising a region of increasing torque above the limit of adhesion. In this respect, it is noted that the torque profile needn't rise continuously, and may also include one or more regions of decreasing torque alongside the at least one region of increasing torque. The precise profile of the torque feedback adopted will depend on the results of human factors studies. In another option, the torque profile may comprise constant torque above the limit of adhesion.

Alternatively, or in addition, the driver feedback signal may include a control signal configured to generate haptic feedback through one or more components of the vehicle.

Said processing module may comprise at least one electronic processor having: an electrical input for receiving said one or more signals each indicative of a vehicle state, for example; and an electronic memory device electrically coupled to the electronic processor and having instructions stored therein.

The processor may be configured to access the memory device and execute the instructions stored therein such that it is operable to obtain an indication of a proximity of a road wheel of the vehicle to a limit of adhesion, and to generate a driver feedback signal in the event that the road wheel is at or beyond a limit of adhesion.

Obtaining an indication of the proximity of the road wheel to its limit of adhesion may entail the processing module determining said proximity, for example based on an indication of the vehicle state. Alternatively, the processing module may receive an indication of said proximity from an external source.

By determining whether the road wheel is at or beyond the limit of adhesion and creating a driver feedback signal, the control system can be used to provide appropriate feedback to a driver to warn them that one or more road wheels of a vehicle have lost traction, or are about to. This allows the driver to take corrective action and thus avoid losing control of the vehicle due to exceeding the limit of adhesion.

The limit of adhesion may be estimated by the control system using one or more of a variety of suitable techniques. As the estimations of the limit of adhesion may be relatively imprecise, the term 'at the limit of adhesion' is intended to cover situations where the road wheel is at or near to the limit of adhesion, to allow for error in the estimation.

The forms of driver feedback that are used provide the basis for intuitive feedback for the driver that will induce them to take appropriate action. This sits in contrast with prior art approaches in which the inherent feedback provided by the steering system when a limit of adhesion is reached, namely a reduction in torque feedback through the steering wheel, is counter-intuitive and can prompt an inappropriate response from the driver.

The one or more components of the vehicle may comprise one or more of the following: a steering member; a seat; a pedal; and a floor.

The driver feedback signal optionally comprises a control signal configured to generate audible feedback through one or more components of the vehicle, in which case the one or more components of the vehicle may comprise one or more of the following: an infotainment system; and a speaker.

Alternatively, or in addition, the driver feedback signal may comprise a control signal configured to generate visible feedback through one or more components of the vehicle, in which case the one or more components of the vehicle may comprise one or more of the following: an infotainment system; and a light.

The driver feedback signal may comprise a torque profile for the steering member of the steer-by-wire steering system, the torque profile comprising a region of decreasing torque above the limit of adhesion.

The control system may comprise an input arranged to receive one or more signals indicative of a vehicle driving state. For example, the one or more signals indicative of a vehicle driving state received by the input may comprise the indication of the proximity of the road wheel of the vehicle to a limit of adhesion. Alternatively, the processor may be configured to determine the proximity of the road wheel of the vehicle to a limit of adhesion based on the one or more signals indicative of a vehicle driving state.

In embodiments including an input, the one or more signals indicative of a vehicle driving state received by the input may comprise a signal indicative of a position of the steering member. Such embodiments may further comprise control means arranged to issue control commands to effect turning of the road wheel in dependence on the signal indicative of the position of the steering member, and in accordance with a nominal relationship between the steering member and the road wheel. The control means may be arranged to deviate from the nominal relationship between the steering member and the road wheel when the processor determines that the road wheel is at or beyond the limit of adhesion. In such arrangements, the control means is optionally arranged to determine a steering wheel position defining a maximum deviation from the nominal relationship, in which case the output may be arranged to issue a driver feedback signal in the event that the steering member is at or beyond the position defining the maximum deviation from the nominal relationship. The control means may be arranged to issue control commands to hold the road wheel at a substantially constant angle while the limit of adhesion is exceeded and the steering member is at or below the position defining the maximum deviation from the nominal relationship.

In the above embodiments, the one or more signals indicative of a present vehicle driving state comprise one or more of the following: a signal indicative of a speed of the vehicle; a signal indicative of a slip angle of the vehicle; a signal generated by a vehicle braking system indicative of a traction state of a road wheel of the vehicle; a selected driving mode; and a signal indicative of a condition of a surface on which the vehicle is travelling.

The control system may comprise a steering controller that comprises the processing module and the output. Alternatively, or in addition, the control system may comprise a vehicle state estimator, which may be configured to determine the proximity of the road wheel of the vehicle to a limit of adhesion.

The control system may be configured to be customisable to provide a driver feedback signal having characteristics desired by a user of the vehicle Another aspect of the invention provides a vehicle steer-by-wire steering system for a vehicle. The vehicle steer-by-wire steering system comprises a steering member that is operable to turn one or more road wheels of the vehicle to alter a direction of travel of the vehicle; a control system of the above aspect; and a feedback system arranged to generate driver feedback in response to the driver feedback signal output by the control system.

The steering member may be electronically connected to the or each road wheel, for example in a steer-by-wire arrangement.

The feedback system may comprise an electric machine that is operable to resist movement of the steering member in accordance with the torque profile of the driver feedback signal.

The invention also extends to a vehicle comprising the control system or the steer-by-wire steering system of the above aspects.

A further aspect of the invention provides a method of controlling a vehicle. The method comprises obtaining an indication of a proximity of a road wheel of the vehicle to a limit of adhesion; generating a driver feedback signal in the event that the road wheel is at or beyond the limit of adhesion; and issuing the driver feedback signal. The driver feedback signal comprises at least one of: a torque profile for a steering member of a steer-by-wire steering system of the vehicle, the torque profile comprising a region of increasing torque above the limit of adhesion; a torque profile for the steering member of the steer-by-wire steering system, the torque profile comprising constant torque above the limit of adhesion; and a control signal configured to generate haptic feedback through one or more components of the vehicle.

In the control system, the vehicle steer-by-wire steering system, the vehicle or the method of the above aspects, the steering member may comprise a steering wheel.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

FIGS. 1 and 2 illustrate general principles that are relevant to the invention and have already been described. One or more embodiments of the invention will now be described, by way of example only, with reference to the remaining drawings, in which:

DETAILED DESCRIPTION

Figure 3:
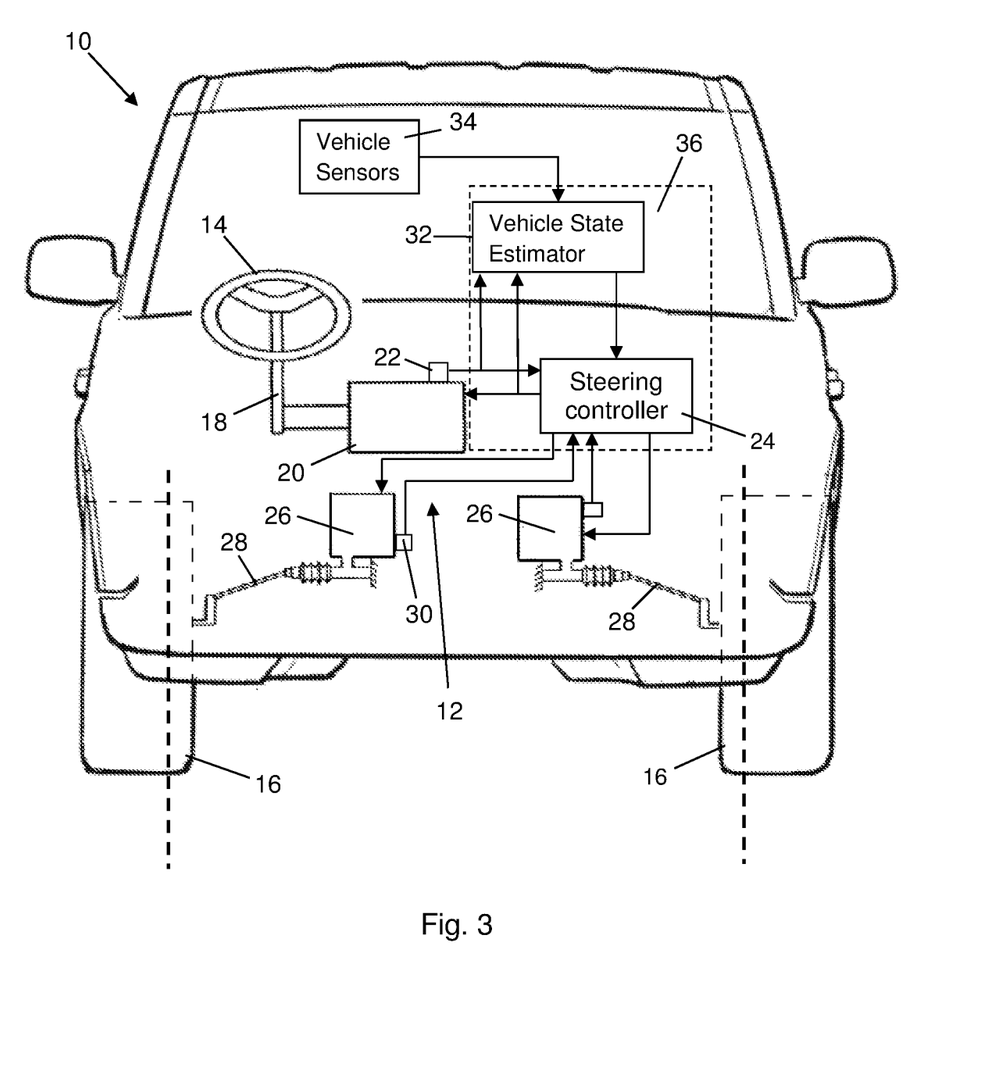
FIG. 3 is a schematic illustration of a steer-by-wire system suitable for use with embodiments of the invention.

FIG. 3 shows in schematic form a vehicle 10 including a steer-by-wire steering system 12, to provide context for embodiments of the invention.

The steer-by-wire steering system 12 shown in FIG. 3 includes a user-operable steering member in the form of a steering wheel 14 that is electronically connected to a pair of road wheels 16 so that the road wheels 16 turn about respective vertical axes in response to rotation of the steering wheel 14, to change a direction of travel of the vehicle 10.

In more detail, the steering wheel 14 is coupled to a steering shaft 18 that in turn drives an electric machine 20 when the steering wheel 14 is rotated by a driver. FIG. 3 shows the steering shaft 18 as being composed of two orthogonal sections that are joined by a universal joint (not shown).

A steering angle sensor 22 attached to the electric machine 20 provides a signal that is indicative of the extent to which the electric machine 20, and in turn the steering wheel 14, has been rotated. This signal therefore provides an indicated steering angle, which is transmitted to a steering controller 24 through a suitable communications network, such as a conventional vehicle CAN bus.

The electric machine 20 is operable to apply torque to the steering shaft 18, thus providing a resistance to turning the steering wheel 14. The magnitude of the torque applied to the steering shaft 18 can be varied according to control commands received from the steering controller 24 to emulate the behaviour of a mechanical steering system, as described in more detail below.

Each road wheel 16 is supported by a respective ball joint (not shown) and is turned by a respective electro-mechanical actuator 26 through a tie-rod 28 in response to control commands received from the steering controller 24. In this respect, the steering controller 24 includes a processing module comprising one or more processors and a readable memory, the processors being configured to receive incoming data and to generate control signals based on that data in accordance with predefined rules held in the memory.

The actuators 26 may be linear, for example, so that extension of an actuator 26 drives pivoting movement of its respective road wheel 16 about a vertical axis crossing the ball joint that supports the wheel.

On receiving the indicated steering angle, the steering controller 24 determines an appropriate extension for each actuator 26 that will, in turn, rotate each of the road wheels 16 to an appropriate extent to change the direction of travel of the vehicle 10 in accordance with the indicated steering angle. Once the actuator extensions have been determined, the steering controller 24 issues control commands through the communications network to operate the actuators 26 to turn their respective road wheels 16 to the appropriate angles. Each actuator 26 includes an actuator sensor 30 that transmits a signal that is indicative of the actuator extension to the steering controller 24, to enable feedback-loop control of the extension of each actuator 26.

Each actuator sensor 30 further provides a signal that is indicative of the force presently exerted by its respective actuator 26 to reach the present extension. The indicated forces are transmitted to the steering controller 24, which determines an appropriate torque for the electric machine 20 to apply to the steering shaft 18 to create resistance to rotation of the steering wheel 14 that is proportional to the total indicated forces exerted by the actuators 26. The steering controller 24 then issues control commands through the communications network to operate the electric machine 20 accordingly. In this way, the steer-by-wire steering system 12 emulates the behaviour of a mechanical steering system as described above.

The steering controller 24 also receives an indication of the vehicle state, namely a summary of instantaneous vehicle operating parameters, from a vehicle state estimator 32. This allows the steering controller 24 to take the vehicle state into account when generating control commands for the actuators 26 and the electric machine 20. For example, the steering ratio may be adjusted in accordance with the vehicle speed.

To enable it to determine the vehicle state, the vehicle state estimator 32 receives a range of signals indicative of vehicle operating parameters from a suite of on-board sensors 34. These sensors 34 may include the steering angle sensor 22 and the actuator sensors 30, for example, along with other sensors such as wheel speed sensors and engine load sensors.

The vehicle state estimator 32 also receives an indication of the control commands issued to the electric machine 20 by the steering controller 24, providing the vehicle state estimator 32 with oversight of the steering shaft torque and thereby creating a more complete picture of the vehicle state.

The vehicle state estimator 32 is also responsible for determining how close the vehicle 10 is operating to the limit of adhesion, based on the vehicle state. Accordingly the vehicle state estimator 32 passes an indication of the proximity of the vehicle 10 to the limit of adhesion to the steering controller 24. In other embodiments, the steering controller 24 may be configured to determine the proximity of the vehicle 10 to the limit of adhesion.

Although the vehicle state estimator 32 is used for a range of functions within the vehicle 10, for the purposes of this description the vehicle state estimator 32 can be considered to form part of a steering control system 36 that also includes the steering controller 24.

In most driving situations, the steering controller 24 acts to turn the road wheels 16 to an extent that is directly proportional to the indicated steering wheel angle, to provide a fixed steering ratio that mimics the behaviour of a conventional mechanical steering system. The steering ratio may be between 8:1 and 15:1, for example. This defines a nominal relationship between the steering wheel 14 and the road wheels 16, which provides a predictable steering response so that the steer-by-wire steering system 12 is straightforward for a driver to operate.

However, as noted above there are certain situations in which the steering controller 24 may deviate from its nominal relationship by varying the steering ratio. In particular, when the tyres of the road wheels 16 are approaching the limit of adhesion, the steering controller 24 may deviate by increasing the steering ratio, so that turning the steering wheel 14 by a given amount produces a much smaller change in road wheel angle than would ordinarily be the case, thereby delaying the point at which the limit of adhesion is reached.

Once the limit of adhesion is reached, the steering controller 24 may deviate further from its nominal relationship by holding the road wheels 16 at a constant angle over a defined range of continued steering wheel rotation. The relationship between the steering wheel 14 and the road wheels 16 may therefore be considered temporarily broken when the road wheels 16 are at the limit of adhesion. In this way, the steering controller 24 acts to hold the road wheels 16 below or at the limit of adhesion to avoid loss of traction.

It is noted that, in certain circumstances, once the limit of adhesion has been exceeded the road wheels 16 may be held beyond it to prevent the vehicle 10 from snapping from an understeer condition to an oversteer condition. This can occur if the slip angle alters too quickly as a result of a driver overreaction to loss of traction, for example.

Various methods exist for estimating the limit of adhesion for a given driving condition. For example, in a simple approach the present vehicle speed, as indicated by a vehicle speed sensor (not shown), may be cross-referenced with a look-up table to determine the maximum slip angle.

Alternatively, the lateral acceleration of the vehicle 10, as measured at its axles for example, may be compared with the vehicle speed and slip angle. If the lateral acceleration is lower than expected, the tyres are assumed to be at or above the limit of adhesion and so are limited to their present angles.

In a further possibility, the vehicle yaw response may be monitored, noting that in sub-limit driving the vehicle's yaw rate response is proportional to the steering wheel rate of application, but when approaching the limit of adhesion the vehicle's yaw rate response slows to the point where the vehicle 10 becomes unresponsive; ultimately resulting in terminal understeer or total loss of adhesion.

The above approaches may also be combined by assessing the coherence between the vehicle yaw response and its lateral acceleration. Below the limit of adhesion, these parameters are expected to maintain a strong coherence, and so any deviation from this relationship can be used as indicative of the vehicle 10 approaching the limit of adhesion.

Alternatively, or in addition, data supplied by an anti-lock braking system (ABS) may be used to recognise when a road wheel 16 begins to lose traction, and therefore provide a direct indication of the instantaneous limit of adhesion.

The present driving mode may be taken into account when calculating the limit of adhesion.

More sophisticated techniques may also take into account present road conditions, noting that the limit of adhesion is dictated by the coefficient of friction between the tyres of the road wheels 16 and the surface on which they travel. For example, the above mentioned look-up tables may be adjusted accordingly if the vehicle 10 detects that it is travelling on a wet road, which will entail lower friction and therefore reduced lateral and longitudinal forces that can be provided by the road wheels 16.

Breaking the relationship between the steering wheel 14 and the road wheels 16 for the purpose of avoiding traction loss when the road wheels 16 are at the limit of adhesion is restricted to a narrow range, so that the steering wheel 14 does not appear to become unresponsive. Accordingly, each time one or more of the road wheels 16 reaches the limit of adhesion, a maximum deviation is defined for the steering wheel angle. Altering the steering wheel angle within a range between an angle corresponding to the limit of adhesion and the maximum deviation has no effect on the road wheel angle. Accordingly, when the steering wheel 14 is rotated within this range, the steering controller 24 does not alter the extension of the actuators 26. Instead, the actuators 26 are held at a fixed position corresponding to the limit of adhesion of the road wheels 16.

If the steering wheel 14 is turned beyond the point of maximum deviation, the steering controller 24 resumes altering the orientation of the road wheels 16 according to the nominal relationship between the steering wheel 14 and the road wheels 16 by applying the usual steering ratio. It therefore remains possible to force the road wheels 16 beyond the limit of adhesion so that the vehicle 10 loses traction. However, various other ways of managing exceeding the limit of deviation from the nominal relationship are also envisaged.

FIGS. 4 to 8 represent some specific driving scenarios to illustrate this principle. Each figure shows the steering wheel 14 of the steer-by-wire steering system 12 alongside a turned road wheel 16, to illustrate the relationship between the steering wheel 14 and the road wheel 16 through a series of driving scenarios. It is noted that for illustrative purposes, FIGS. 4 to 8 assume a steering ratio of 1:1, which is much lower than would typically be used in practice.

Figure 4:
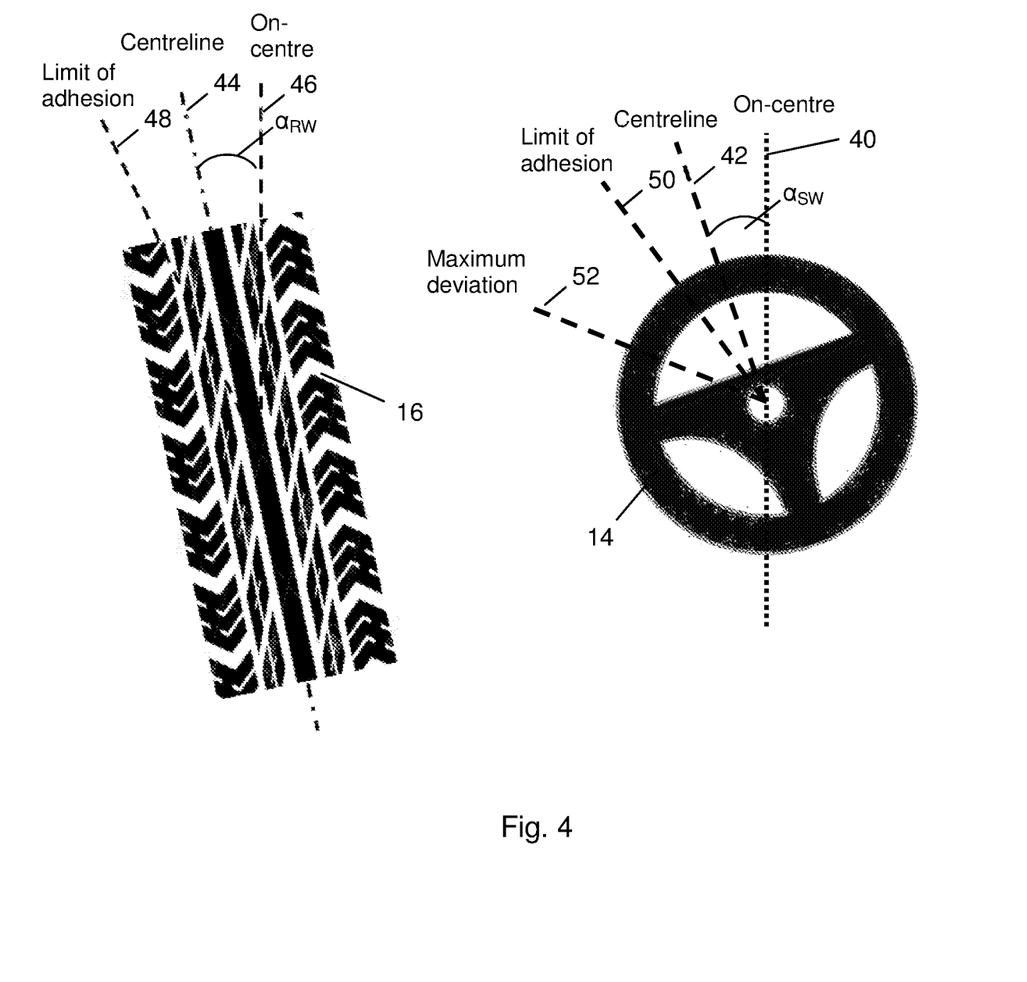
FIGS. 4 to 8 show a steering wheel and a road wheel of the steer-by-wire system of FIG. 3 in a series of driving scenarios.

Starting with FIG. 4, the steering wheel 14 of the steer-by-wire steering system 12 is shown with a vertical dashed line 40 through it that represents a rest position that corresponds to no change in direction of travel of the vehicle 10. This rest position is commonly referred to as the 'on-centre' position. FIG. 4 shows the steering wheel 14 rotated about a central axis by approximately 20° anticlockwise (as viewed in the figure) with respect to the on-centre position, so that a centreline 42 of the steering wheel 14 makes an angle, referred to as $\alpha_{SW}$, of 20° with respect to the on-centre position. This angle reflects the degree of change of direction of travel of the vehicle 10 desired by a driver.

A road wheel 16 is shown beside the steering wheel 14 at an orientation corresponding to the 1:1 steering ratio of this example. Accordingly, a centreline 44 of the road wheel 16 is set at an angle of 20° with respect to a vertical line 46 representing an on-centre position of the road wheel 16. This angle is referred to as $\alpha_{RW}$.

In this example, the vehicle 10 is travelling at a speed that entails a limit of adhesion corresponding to a steering angle that is higher than the input angle of 20°. The steering angle that would orient the road wheels 16 at the limit of adhesion while the nominal relationship between the steering wheel 14 and the road wheels 16 is maintained and under the present driving condition is represented by dashed lines 48, 50 on the road wheel 16 and the steering wheel 14 respectively at approximately 45° with respect to the on-centre position.

Beyond the limit of adhesion, a further dashed line 52 in the steering wheel 14 shown in FIG. 4 indicates a maximum deviation from the nominal relationship that the steering wheel 14 would be allowed to take before the nominal relationship would be resumed and the road wheel 16 forced beyond the limit of adhesion. Alternatively, the steering controller 24 may adopt a different relationship beyond the limit of adhesion according to the requirements of each individual application.

Figure 5:
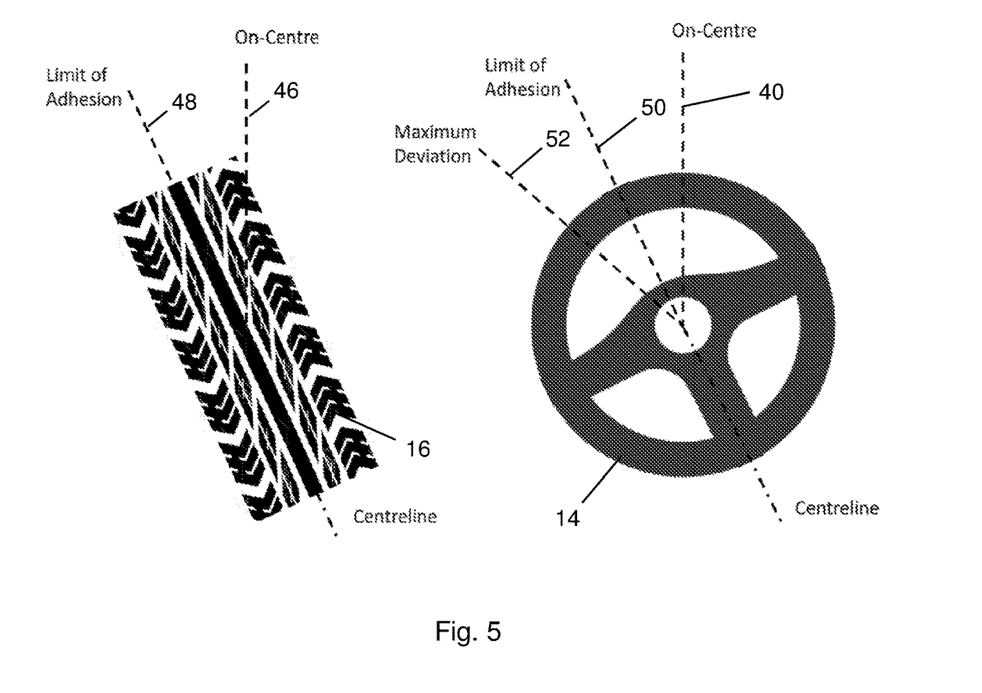

FIG. 5 shows the steering wheel 14 rotated a little further anticlockwise so that $\alpha_{SW}$ corresponds to the limit of adhesion, at 45°. Since the limit of adhesion has not been exceeded, the steering ratio is maintained and so the road wheel 16 is oriented such that $\alpha_{RW}$ is also 45°. Accordingly, FIG. 5 shows the road wheel 16 in a position corresponding to the limit of adhesion for the present driving parameters. Therefore, if $\alpha_{RW}$ were to increase, the road wheel 16 would lose traction.

Figure 6:
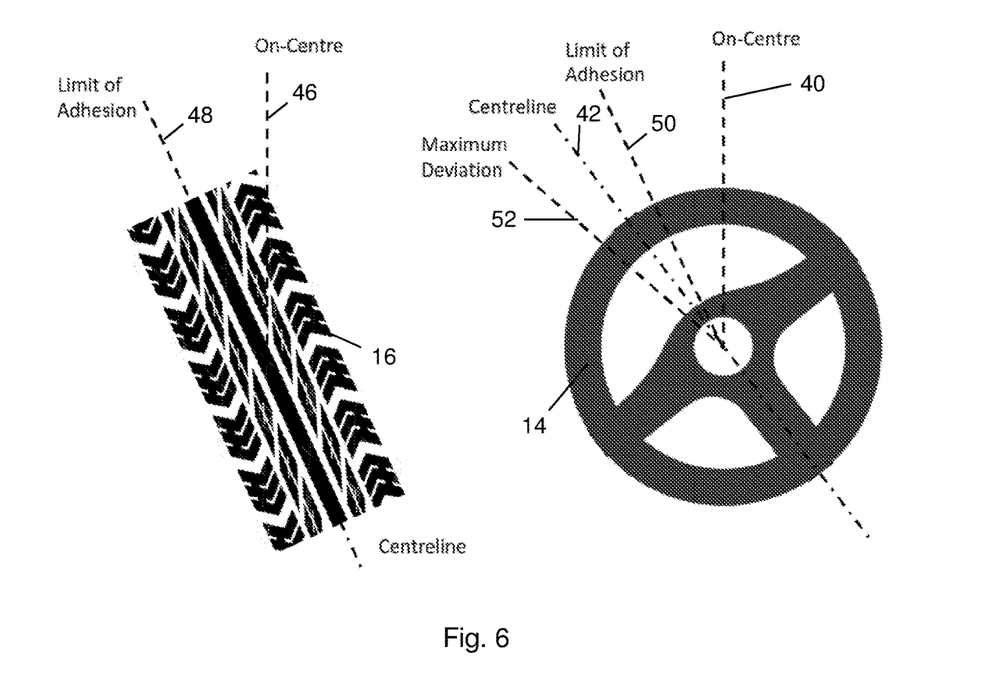

FIG. 6 shows the steering wheel 14 rotated further still, so that $\alpha_{SW}$ exceeds the angle corresponding to the limit of adhesion.

In a fixed steering ratio system, such as a conventional mechanical system, the road wheels 16 are turned to a position directly corresponding to the input angle. If such a system were operated in the manner illustrated in FIG. 6, the vehicle 10 would lose traction as $\alpha_{SW}$ exceeds the angle corresponding to the limit of adhesion.

However, as noted above the electronic steer-by-wire steering system 12 of FIG. 3 can vary the steering ratio to deviate from the nominal relationship between the steering wheel 14 and the road wheels 16 to prevent traction loss. In this example, $\alpha_{SW}$ remains below the maximum allowable deviation from the nominal steering relationship, and so the steering controller 24 allows the steering relationship to deviate from the nominal steering ratio and acts as though the steering wheel input angle matches the angle corresponding to the limit of adhesion. The road wheel 16 is therefore held at the limit of adhesion so that $\alpha_{RW}$ is unchanged relative to FIG. 5, allowing the road wheel 16 to maintain traction.

Figure 7:
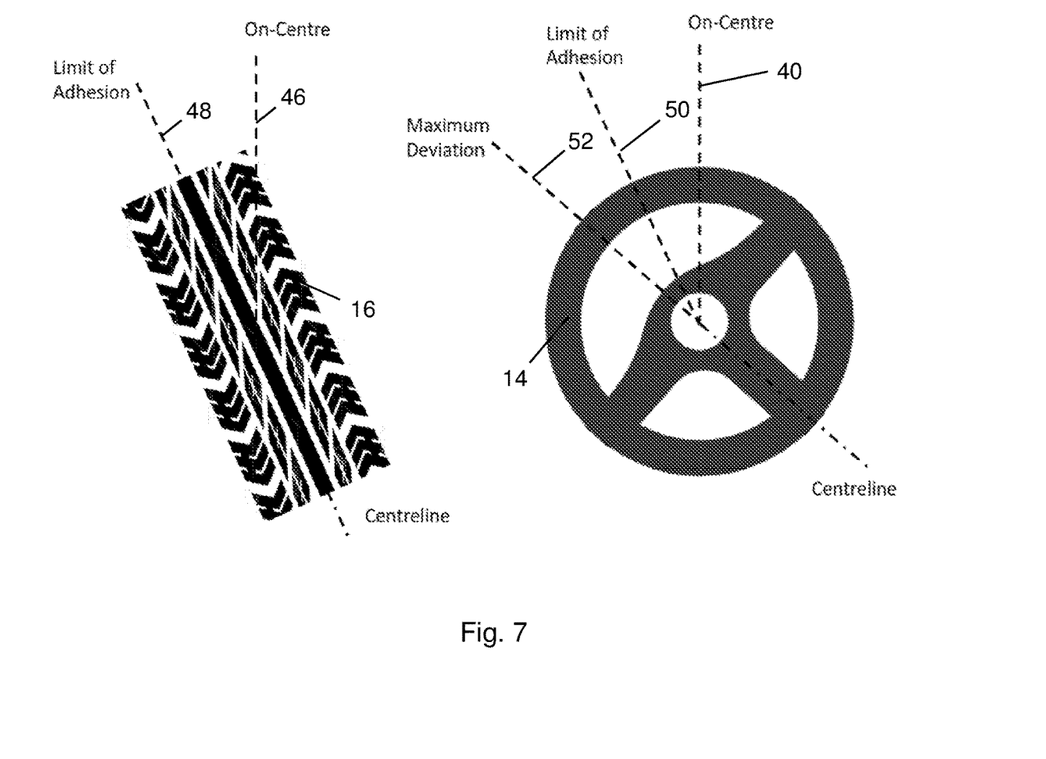

FIG. 7 shows the steering wheel 14 as rotated yet further, so that $\alpha_{SW}$ now matches the point of the maximum allowable deviation from the nominal relationship. As the maximum deviation has not been exceeded at this stage, the steering controller 24 applies a maximised deviation from the nominal relationship in that $\alpha_{RW}$ remains unchanged from the scenario in FIG. 6, so that the road wheel 16 remains at the limit of adhesion.

Figure 8:
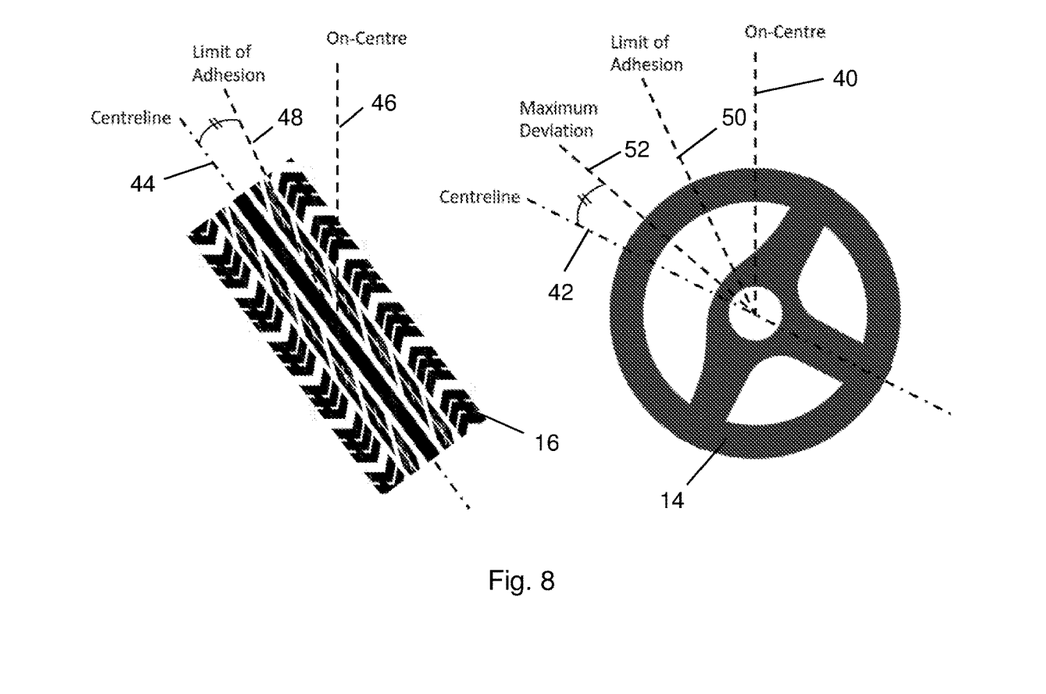

Finally, FIG. 8 shows a scenario in which the steering wheel 14 is turned to the extent that $\alpha_{SW}$ is greater than the angle corresponding to the point of maximum deviation. Accordingly, the steering controller 24 resumes the nominal relationship between the steering wheel 14 and the road wheel 16, and turns the road wheel 16 to an extent corresponding to the amount by which the steering wheel angle exceeds the point of maximum deviation. Therefore, an angle between $\alpha_{SW}$ and the line representing the point of maximum deviation on the steering wheel 14 is equal to an angle between $\alpha_{RW}$ and the line representing the limit of adhesion on the road wheel 16 in FIG. 8.

While allowing deviation from the nominal relationship between the steering wheel 14 and the road wheels 16 provides a useful margin of error for the driver, there are situations in which a driver may wish to force a loss of traction of the road wheel 16. Therefore, to avoid excessive interference by the steering controller 24, the allowable deviation is limited to a relatively small range. Otherwise, if the allowable deviation were too large the system may appear unresponsive, and a driver may even believe that a fault had developed. Moreover, it is considered desirable to allow the driver to force a loss of traction should they wish to, thereby allowing the driver to retain ultimate control of the vehicle 10.

As $\alpha_{SW}$ is larger than the angle corresponding to the maximum deviation, the vehicle 10 will lose traction under the conditions represented in FIG. 8. It is noted that such traction loss may be mitigated by the allowable deviation, due to the fact that the road wheels 16 are turned beyond their limit of adhesion to a lesser extent than they would be in a steering system having a fixed steering ratio.

It should be appreciated that the values used in this example are illustrative only, and in practice may be different. In particular, the values adopted may depend on the results of human factor and safety studies.

Whatever the range of deviation allowed, such deviation from the nominal relationship must be managed properly and in a manner that provides intuitive feedback for the driver whilst taking their actions into account. Various methods for doing so are set out in the description that follows. It is noted, for example, that the driver may instinctively turn the steering wheel 14 to a certain angle during loss of traction, which should be recognised as the driver's intended path and acted on accordingly.

It is noted that in each of the above examples, the limit of adhesion could be breached by increasing the vehicle speed whilst maintaining a steady steering angle, instead of by increasing the slip angle by turning the steering wheel 14.

As noted above, in a steer-by-wire steering system such as that shown in FIG. 3 in which deviation from the nominal relationship between the steering wheel 14 and the road wheels 16 is allowed, it is unclear how to control the resistance to rotating the steering wheel 14 during periods of such deviation in a manner that is helpful to a driver. The steer-by-wire steering system 12 of FIG. 3 is also subject to the problem of managing steering resistance during a transition over the limit of adhesion that affects all steering system types.

To address these problems, in general terms embodiments of the invention propose ways to signal to a driver that the limit of adhesion is approaching, or that the steering wheel 14 is operating outside the nominal relationship with the road wheels 16. Some specific examples are described below, although it should be noted that the scope of the inventive concept extends to any form of feedback that may be provided to a driver for the above defined purpose, including the use of haptic feedback, and warning lights and/or sounds, for example.

Figure 9:
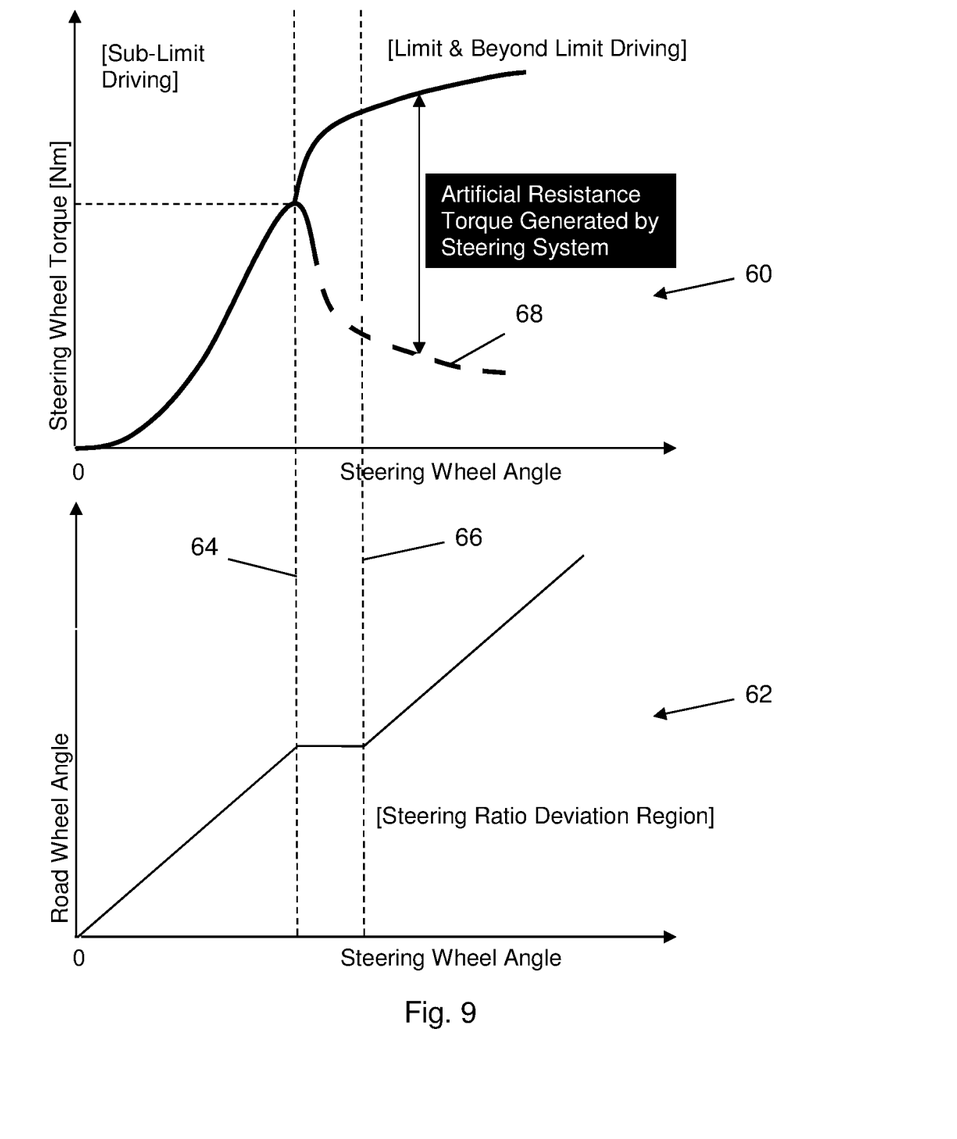
FIG. 9 is a graph representing a steering resistance profile according to an embodiment of the invention.

FIG. 9 shows a pair of graphs stacked vertically, in which an upper graph 60 is similar to FIG. 2 in that it plots steering wheel angle against steering wheel torque, whereas a lower graph 62 plots steering wheel angle against road wheel angle.

The upper graph 60 therefore shows a way in which the steer-by-wire steering system 12 can provide feedback to the driver to alert them to the fact that the present operating condition of the vehicle 10 is such that it is approaching the limit of adhesion. For the steer-by-wire steering system 12 of FIG. 3, the steering wheel torque shown in FIG. 9 corresponds to the torque applied by the electric machine 20 under the control of the steering controller 24.

The lower graph 62 indicates the relationship between the steering wheel angle and the road wheel angle and therefore provides context for the feedback shown in the upper graph 60.

A first vertical dashed line 64 in FIG. 9 represents the steering wheel angle corresponding to the limit of adhesion for the present vehicle state. A second vertical dashed line 66, which is offset to the right of the first dashed line 64 in FIG. 9, represents the maximum allowable deviation from the nominal relationship between the steering wheel 14 and the road wheels 16.

The conventional response shown in FIG. 2, in which the steering resistance reduces sharply once the limit of adhesion is exceeded, is represented by a dashed curve 68 in FIG. 9. As already explained, this response arises when the torque applied to the steering wheel 14 is directly proportional to the lateral force exerted by the road wheels 16, which drops when the tyres lose traction.

In the embodiment shown in FIG. 9, the steering controller 24 is arranged to alter the way in which the steering resistance is controlled as the limit of adhesion is approached and exceeded. Instead of maintaining a resistance that is proportional to the twisting moment exerted by the road wheels 16, as shown in FIG. 9 the steering resistance is increased by the steering controller 24 at and beyond the limit of adhesion.

In this respect, it is noted that for a given vehicle velocity, the application of a steering wheel angle below the limit of adhesion will result in a specific road wheel angle that, in combination with the vehicle velocity, will generate a tyre slip angle. This in turn generates a lateral acceleration, resulting in a force through the tyre contact patch.

In sub-limit driving, a specific steering resistance that is proportional to the force through the contact patch is applied at the steering wheel 14 to balance the system. As the lower graph 62 shows, in this region the road wheel angle remains directly proportional to the steering wheel angle up to the limit of adhesion, which represents the nominal relationship between the steering wheel 14 and the road wheels 16.

At and beyond the limit of adhesion, the relationship between the force at the contact patch and the steering wheel resistance is manipulated to provide useful and intuitive feedback for the driver. In this respect, it is noted that the steering resistance profile shown in FIG. 9 is merely an example of the type of feedback that may be used in embodiments of the invention to indicate that a road wheel is at or beyond the limit of adhesion. In alternatives, it is also possible for the profile to include regions of decreasing torque, or for the steering resistance to be held at a constant level at and above the limit of adhesion. Moreover, reducing steering resistance may be employed alongside other forms of feedback. The precise steering resistance profile and overall feedback strategy adopted is likely to depend on the outcome of human factor and safety studies.

Focussing on the specific feedback strategy shown in FIG. 9, in the lower graph 62, when the limit of adhesion is reached the relationship between the steering wheel angle and the road wheel angle is broken temporarily so that further increasing the steering wheel angle within a narrow region up to the maximum allowable deviation has no impact on the road wheel angle.

Beyond this region, the nominal relationship resumes and so the steering wheel angle is once again directly proportional to the road wheel angle, albeit at an offset relative to steering wheel angles below the limit of adhesion.

As shown in the upper graph 60, once the limit of adhesion is reached the increase in steering resistance is sharp while the steering wheel 14 turns within the range of allowable deviation from the nominal relationship. This provides a clear indication to the driver that the limit has been reached and will be exceeded if the steering wheel 14 is turned further. In practical terms, this approach also makes it difficult for the driver to turn the steering wheel 14 to a sufficient extent to exceed the limit of adhesion, which may avoid the driver accidentally turning the steering wheel 14 in this manner, and may also act as a disincentive to reckless driving.

Once the limit of adhesion is exceeded, the rate at which steering resistance increases reduces significantly. However, the resistance continues to rise as the steering angle increases, unlike in conventional systems. This means that it gets progressively harder for a driver to worsen a loss of traction of the vehicle 10, which acts as a safety measure.

It is noted that the technique shown in FIG. 9 is equally applicable to conventional mechanical systems for warning a driver of an approaching limit of adhesion. As steering resistance is inherent to mechanical systems, to implement this technique an additional motor may need to be installed onto a steering column of the system, for example, to apply the additional torque required to provide an increase in steering resistance at and beyond the limit of adhesion.

As already noted, the torque profile shown in FIG. 9 is only one example of the type of profile that may be used to provide feedback relating to a limit of adhesion to a driver. In an alternative, the steering controller 24 may be configured to create a dramatic drop in steering resistance when the limit of adhesion is reached, or when the steering wheel 14 and road wheels 16 have departed from their nominal relationship. This may act as a more obvious warning to the driver, which is therefore more likely to be noticed and acted upon than the subtle change in resistance that occurs inherently through conventional torque feedback. An increase in steering resistance could then be applied as the maximum deviation from the nominal relationship is approached, to deter the driver from turning the steering wheel 14 beyond this point.

Another technique that may be used to alert the driver to an approaching limit of adhesion is haptic feedback. Such feedback is already widely used in gaming applications and in mobile devices, for example, and typically involves vibrating a component in contact with a user, in this case a driver of the vehicle 10.

For example, any part of the vehicle 10 with which the driver makes contact, including the steering wheel 14, the driver seat, the floor and the driving pedals, may be arranged to vibrate as the limit of adhesion approaches. To this end, haptic feedback mechanisms may be embedded within such vehicle components to generate the required vibrations on receiving an electrical excitation signal from the steering controller 24. For example, the steering wheel 14 may include a shaker that generates vibrations in a similar manner to the feedback mechanisms used in games console controllers. Alternatively, an electronic power-assisted steering (EPAS) motor oscillating in a fixed steering system could provide the necessary feedback.

The vibrations could be produced by manipulating the steering wheel resistance, for example in the form of symmetrical oscillation around the nominal steering torque.

Alternatively, the vibrations may comprise asymmetrical oscillation, so that the steering wheel resistance is weighted in a manner that indicates the direction in which the driver should turn the steering wheel 14 to end any deviation from the nominal steering relationship. In either case, the amplitude of the vibrations may be proportional to the extent of deviation from the nominal relationship.

However such vibrations are produced, they will be sensed by the driver, and so act as a clear warning of the approaching limit.

The magnitude and/or the frequency of the vibrations may be increased as the limit of adhesion draws closer, to provide further information for the driver. The vibrations may be continuous, or alternatively they may be delivered in pulses. In the latter case, the frequency of the pulses of vibrations may increase as the steering wheel 14 is turned further towards an angle corresponding to the limit of adhesion, or as the vehicle 10 accelerates towards the limit of adhesion, to provide an escalating warning to the driver.

Once the limit of adhesion is exceeded, the vibrations may continue to increase in magnitude and/or frequency, to indicate the worsening nature of the driving situation. Alternatively, the vibrations may cease beyond the limit of adhesion, on the assumption that the driver has deliberately forced a loss of traction of the vehicle 10 and so does not require further feedback. The option selected may depend on a present driving mode. For example, continued increasing vibrations beyond the limit of adhesion may be employed in a normal driving mode, whereas vibrations may cease beyond the limit of adhesion if the vehicle 10 is in a sport mode.

It is noted that two or more techniques for alerting the driver of a limit of adhesion may be used in combination. For example, the increasing torque feedback shown in FIG. 9 may be used alongside haptic feedback, to provide an enhanced warning.

As with the altered torque feedback technique, haptic feedback may be used with steer-by-wire steering systems. Distinct types of feedback can be used to indicate when the steering wheel 14 has deviated from the nominal relationship with the road wheels 16 and so the vehicle 10 is driving at the limit of adhesion, and when the limit of adhesion is exceeded.

The use of various forms of feedback to warn of an approaching limit of adhesion may reduce the need to allow deviation from the nominal relationship between the steering wheel 14 and the road wheels 16, since the driver is made aware of the limit of adhesion and so may not require the same margin of error. The allowable deviation may therefore be reduced in such arrangements. This enables the steer-by-wire steering system 12 to operate closer to a fixed steering ratio, which is desirable from a driver's perspective as it provides a more predictable steering response and reduces interference from the steering controller 24.

Figure 10:
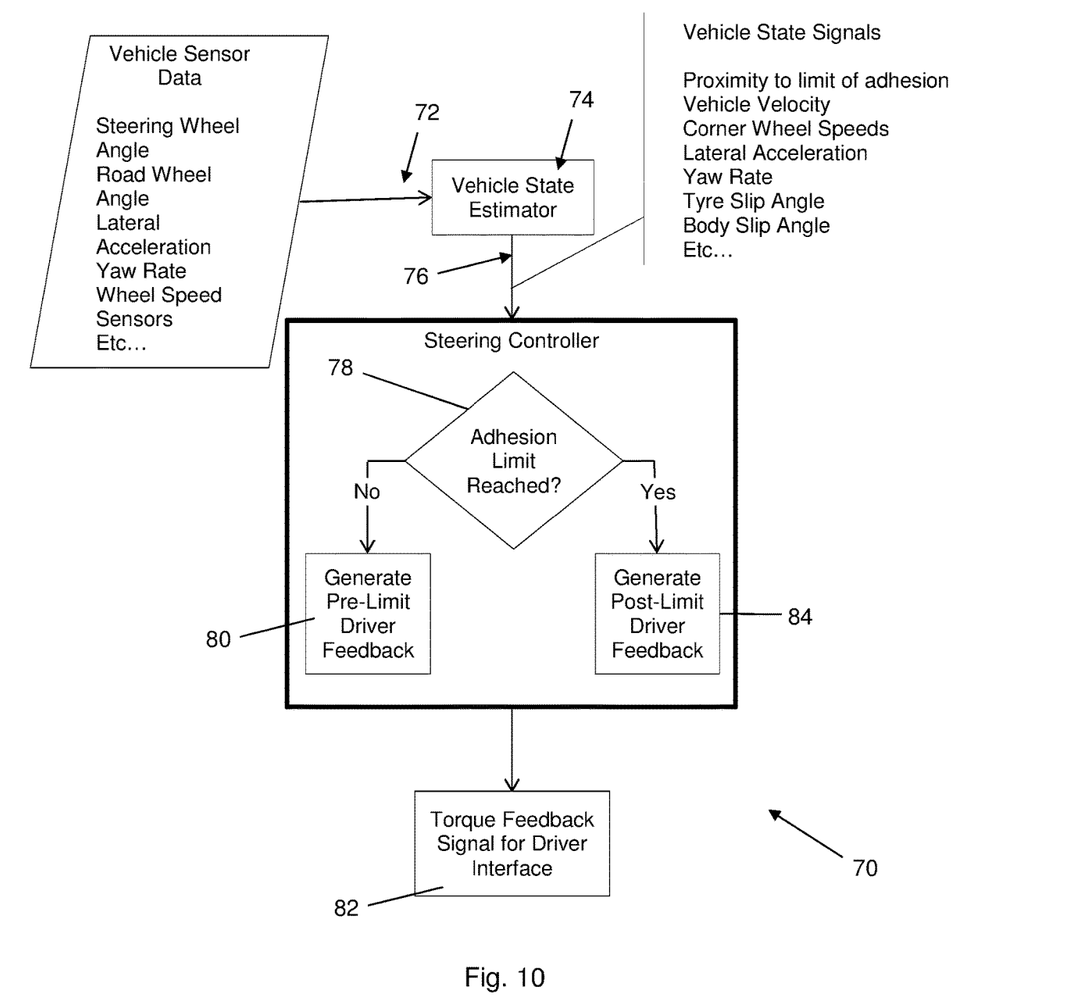
FIG. 10 is a flow diagram showing a process according to an embodiment of the invention for generating driver feedback relating to a limit of adhesion.

FIG. 10 is a flow diagram showing a process 70 that the vehicle state estimator 32 and the steering controller 24 iterate to provide feedback to the driver when appropriate.

The process 70 starts with the vehicle state estimator 32 receiving at step 72 sensor data in the form of signals relating to a present driving state of the vehicle 10. These signals may include, for example, an indication of the vehicle speed provided by an on-board vehicle speed sensor or wheel speed sensors, and indications of the road wheel angles of the vehicle wheels, for example as provided by the actuator sensors 30. The sensor data may also include indications of the steering wheel angle, lateral acceleration, yaw rate the state of an ABS, and a selected driving mode, for example, to provide a more complete picture of the vehicle state.

Based on the sensor data, the vehicle state estimator 32 determines at step 74 various operational parameters for the vehicle 10, including whether the tyres of the road wheels 16 of the vehicle 10 are within the limit of adhesion using any of the techniques described above, and also the proximity to the limit of adhesion. The vehicle state estimator 32 also determines or consolidates parameters such as the vehicle velocity, corner wheel speeds, lateral acceleration, yaw rate, and slip angles for the tyres and the vehicle body. Thus, the vehicle state estimator 32 provides a complete overview of the vehicle state.

The parameters calculated by the vehicle state estimator 32 are forwarded at step 76 to the steering controller 24, along with an indication of whether the vehicle 10 is approaching, or has exceeded, the limit of adhesion. If the steering controller 24 finds at step 78 that the vehicle 10 is operating within the limit of adhesion, it generates at step 80 sub-limit driver feedback, namely an appropriate steering resistance, which is then output at step 82 as a driver feedback signal. The process 70 then returns to the first step and the steering controller 24 awaits updated indications of the vehicle driving state from the vehicle state estimator 32, to reiterate the process 70.

If the vehicle 10 is found to be operating at or beyond the limit of adhesion, so that one or more road wheels 16 of the vehicle 10 is losing or has lost traction, the steering controller 24 generates at step 84 a post-limit driver feedback signal that can be used to alert the driver to the fact that the limit of adhesion has been reached or exceeded.

The driver feedback signal can be used to generate any of the types of feedback referred to above. For example, the driver feedback signal may comprise a torque profile such as that shown in FIG. 9, which can be used to control the electric machine 20 to vary the steering resistance in a manner that indicates to the driver that the vehicle 10 is at or beyond the limit of adhesion.

Alternatively, or in addition, the driver feedback signal may include signals configured to drive haptic feedback mechanisms embedded within the steering wheel 14, for example, to deliver haptic feedback to the driver as described above.

The driver feedback signal may further comprise signals that trigger visual and audible warnings for the driver. These warnings may be delivered through dedicated alarm devices, such as a warning light or an alarm speaker device on a dashboard of the vehicle 10, or alternatively through an infotainment system.

Once the driver feedback signal has been generated and transmitted to the relevant components of the vehicle 10, the process 70 returns to the initial step. The steering controller 24 then awaits updated indications of the vehicle driving state from the vehicle state estimator 32 to reiterate the process 70. In this way, the vehicle state estimator 32 and the steering controller 24 provide continuous dynamic feedback for the driver.

Many modifications may be made to the above examples without departing from the scope of the present invention as defined in the accompanying claims.

For example, instead of a single, integrated steering controller, a steering control system involving two or more controllers may be used to control the steer-by-wire steering system. For example, each actuator may be operated by a respective dedicated controller in response to commands received from a master controller.

In a useful option, in some embodiments the control system is customisable so that the driver feedback strategy can be tailored to individual drivers according to their preferences. So, the control system may store several different user profiles, each of which is optimised for a different driver of the vehicle. For example, one profile may include driver feedback in the form of sharply increasing steering resistance at and beyond the limit of adhesion, whereas another profile may implement constant steering torque in combination with haptic feedback. Each user profile may be configured through a user interface such as an infotainment system, for example.

The invention claimed is:

1. A control system for a steer-by-wire steering system of a vehicle, the control system comprising:
    a processing module configured to obtain an indication of a proximity of a road wheel of the vehicle to a limit of adhesion;
    a control means arranged to issue control commands to effect turning of the road wheel in dependence on a signal indicative of a position of a steering member in accordance with a nominal relationship between the steering member and the road wheel of the vehicle;
    wherein the control means is arranged to deviate from the nominal relationship between the steering member and the road wheel of the vehicle when the control means determines that the road wheel is at or beyond the limit of adhesion;
    and wherein the control means is arranged to generate an output arranged to issue a driver feedback signal when the road wheel is at or beyond the limit of adhesion.

2. The control system of claim 1, wherein the driver feedback signal comprises a torque profile for the steering member above the limit of adhesion.

3. The control system of claim 1, wherein the driver feedback signal comprises a control signal configured to generate, through at least one component of the vehicle, a feedback that is one or more of haptic, audible, visible, or customizable;
    wherein the at least one component of the vehicle for haptic feedback comprises one or more of: the steering member, a seat, a pedal, or a floor;
    wherein the at least one component of the vehicle for audible feedback comprises one or both of an infotainment system or a speaker;
    wherein the at least one component of the vehicle for visible feedback comprises one or both of an infotainment system or a light; and
    wherein the customizable feedback comprises characteristics desired by a user of the vehicle.

4. The control system of claim 1, comprising an input arranged to receive one or more signals indicative of a vehicle driving state; wherein the one or more signals indicative of a vehicle driving state comprise one or more of: the indication of the proximity of the road wheel of the vehicle to the limit of adhesion; the signal indicative of the position of the steering member; a signal indicative of a speed of the vehicle; a signal indicative of a slip angle of the vehicle; a signal generated by a vehicle braking system indicative of a traction state of the road wheel of the vehicle; a selected driving mode; and a signal indicative of a condition of a surface on which the vehicle is travelling.

5. The control system of claim 4, wherein the processing module is configured to determine the proximity of the road wheel of the vehicle to the limit of adhesion based on the one or more signals indicative of a vehicle driving state.

6. The control system of claim 1, wherein the control means is arranged to determine a steering member position defining a maximum deviation from the nominal relationship.

7. The control system of claim 6, wherein the output is arranged to issue the driver feedback signal in the event that the steering member is at or beyond the position defining the maximum deviation from the nominal relationship.

8. The control system of claim 6, wherein the control means is arranged to issue the control commands to hold the road wheel at a substantially constant angle while the limit of adhesion is exceeded and the steering member is at or below the position defining the maximum deviation from the nominal relationship.

9. The control system of claim 4, wherein the one or more signals indicative of the vehicle driving state comprise one or more of the following: the signal indicative of the speed of the vehicle; the signal indicative of the slip angle of the vehicle; the signal generated by the vehicle braking system indicative of the traction state of the road wheel of the vehicle; the selected driving mode; and the signal indicative of the condition of the surface on which the vehicle is travelling.

10. The control system of claim 1, comprising a steering controller that comprises the processing module and the output.

11. The control system of claim 1, comprising a vehicle state estimator configured to determine the proximity of the road wheel of the vehicle to the limit of adhesion.

12. The control system of claim 1, wherein the steering member comprises a steering wheel.

13. A vehicle steer-by-wire steering system for a vehicle, comprising:
    the control system according to claim 1, wherein the steering member is operable to turn the road wheel of the vehicle to alter a direction of travel of the vehicle; and
    a feedback system arranged to generate driver feedback in response to the driver feedback signal.

14. The vehicle steer-by-wire steering system of claim 13, wherein the feedback system comprises an electric machine that is operable to resist movement of the steering member in accordance with a torque profile of the driver feedback signal.

15. The vehicle steer-by-wire steering system of claim 13, wherein the steering member comprises a steering wheel.

16. A vehicle comprising a control system for a steer-by-wire steering system, the control system comprising:
a processing module configured to obtain an indication of a proximity of a road wheel to a limit of adhesion;
a control means arranged to issue control commands to effect turning of the road wheel in dependence on a signal indicative of the position of a steering member in accordance with a nominal relationship between the steering member and the road wheel;
wherein the control means is arranged to deviate from the nominal relationship between the steering member and the road wheel when the control means determines that the road wheel is at or beyond the limit of adhesion;
and wherein the control means is arranged to generate an output arranged to issue the driver a feedback signal when the road wheel is at or beyond the limit of adhesion.

17. The vehicle of claim 16, comprising a feedback system arranged to generate driver feedback in response to the driver feedback signal, wherein the feedback system comprises an electric machine that is operable to resist movement of the steering member in accordance with a torque profile of the driver feedback signal.

18. A method of controlling a vehicle, the method comprising:
obtaining an indication of a proximity of a road wheel to a limit of adhesion;
generating a driver feedback signal in the event that the road wheel is at or beyond the limit of adhesion; and
issuing the driver feedback signal, wherein the driver feedback signal comprises at least one of:
a first torque profile for a steering member of a steer-by-wire steering system of the vehicle, the first torque profile comprising a region of increasing torque above the limit of adhesion;
a second torque profile for the steering member of the steer-by-wire steering system of the vehicle, the second torque profile comprising a constant torque above the limit of adhesion; and
a control signal configured to generate haptic feedback through one or more components of the vehicle.

19. The method of controlling a vehicle of claim 18, wherein the steering member comprises a steering wheel.

\* \* \* \* \*